US005734527A

United States Patent [19]

Reinhart

[11] Patent Number: 5,734,527
[45] Date of Patent: Mar. 31, 1998

[54] DISK DRIVE MAGNETIC ACTUATOR LATCH MECHANISM HAVING A LATCH LEVER WITH MAGNETIC MEMBERS ON EACH END THEREOF FOR LATCHING AND UNLATCHING THE ACTUATOR USING VOICE COIL MOTOR MAGNET

[75] Inventor: Robert C. Reinhart, San Jose, Calif.

[73] Assignee: International Business Machines Corporation, Armonk, N.Y.

[21] Appl. No.: 722,432

[22] Filed: Oct. 7, 1996

[51] Int. Cl.$^6$ ....................................................... G11B 5/54
[52] U.S. Cl. ....................................................... 360/105
[58] Field of Search ........................................... 360/105

[56] References Cited

U.S. PATENT DOCUMENTS

| | | | |
|---|---|---|---|
| 4,562,500 | 12/1985 | Bygdnes | 360/105 |
| 4,965,684 | 10/1990 | Stefansky | 360/78.12 |
| 4,985,793 | 1/1991 | Anderson | 360/105 |
| 5,003,422 | 3/1991 | Sun et al. | 360/105 |
| 5,117,318 | 5/1992 | Immler et al. | 360/105 |
| 5,363,261 | 11/1994 | Eckberg et al. | 360/105 |
| 5,369,538 | 11/1994 | Moe et al. | 360/106 |
| 5,381,290 | 1/1995 | Cheng | 360/105 |

FOREIGN PATENT DOCUMENTS

| | | | |
|---|---|---|---|
| 1-294279 | 11/1989 | Japan | G11B 21/02 |
| 3-254480 | of 1991 | Japan | G11B 21/22 |
| 3-141085 | 6/1991 | Japan | G11B 21/02 |
| 4-26969 | 1/1992 | Japan | G11B 21/22 |
| 4-67371 | 3/1992 | Japan | G11B 21/12 |
| 4-147476 | 5/1992 | Japan | G11B 21/12 |
| 5-151737 | 6/1993 | Japan | G11B 21/22 |
| 6-236645 | 8/1994 | Japan | G11B 21/22 |
| WO93/19460 | 9/1993 | WIPO | G11B 5/54 |

OTHER PUBLICATIONS

IBM, TDB, vol. 38, No. 06, Jun. 1995, "Normally Closed Inertia Latch for a Disk Drive Rotary Actuator".

Primary Examiner—A. J. Heinz
Attorney, Agent, or Firm—Noreen A. Krall

[57] ABSTRACT

A disk drive magnetic actuator latch mechanism for use in hard disk drives. The present invention discloses a latch mechanism which includes a latch lever having a magnetic member attached to or molded into each end of the lever. The lever is pivotally mounted about a pivot pin in the vcm assembly. The magnet member located on the latch lever tail is positioned between the vcm magnets when the mechanism is in the latched state. The unlatching force is provided by the presence of the magnetic member in the vcm gap, as the attraction of the member in the vcm field resists rotation of the latch lever.

10 Claims, 9 Drawing Sheets

DISK DRIVE MAGNETIC ACTUATOR LATCH MECHANISM HAVING A LATCH LEVER WITH MAGNETIC MEMBERS ON EACH END THEREOF FOR LATCHING AND UNLATCHING THE ACTUATOR USING VOICE COIL MOTOR MAGNET

BACKGROUND OF THE INVENTION.

1. Field of the Invention

This invention relates in general to disk drives, and in particular to an improved magnetic actuator latch for use in hard disk drives.

2. Description of Related Art

Moving magnetic storage devices, especially magnetic disk drives, are the memory device of choice. This is due to their expanded non-volatile memory storage capability together with a relatively low cost. Accurate retrieval of the stored information from these devices becomes critical, requiring the magnetic transducer to be positioned as close to the storage media as possible. Optimally, the transducer may actually contact the media.

Magnetic disk drives are information storage devices which utilize at least one rotatable magnetic media disk having concentric data tracks defined for storing data, a magnetic recording head or transducer for reading data from and/or writing data to the various data tracks, a slider for supporting the transducer adjacent the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air bearing, generated by the rotating disk.

Alternatively, the transducer may operate in contact with the surface of the disk. Thus the suspension provides desired slider loading and dimensional stability between the slider and an actuator arm which couples the transducer/slider/suspension assembly to the actuator. The suspension is required to maintain the transducer and the slider adjacent to the data surface of the disk with as low a loading force as possible. The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks. A rotary voice coil motor (vcm) is attached to the rear portion of the actuator arms to power movement of the actuator over the disks.

Any time the rotating magnetic disk of the disk drive system is brought to a stopped condition, there is no aerodynamic cushion available to float or fly the slider above the surface. To prevent damage to the surface of a magnetic disk whenever not rotating, it is conventional to park the transducer/slider in a landing zone containing no data so that contact with the disk by the slider will not cause any significant damage and will not destroy magnetically recorded data. However, simply parking the slider does not address the possibility that the disk drive may be impacted by a force sufficient to dislodge the actuator from its parked position, and thus move the slider onto the recording surface of the magnetic disk. Accordingly, it is important that the actuator which positions the slider must be restricted or otherwise held in its parked position to prevent any damage to the data recording region of the disk surface by slider movement over the surface without an interposed aerodynamic film and to minimize stiction, as will be described below, between the slider and disk by holding the slider in the landing zone.

Extremely smooth surfaces exist on both the disk surface and the magnetic recording face of the slider attached to the load arm of the actuator. These extremely smooth surfaces are necessary to support the low fly height associated with high density recording. Without the aerodynamic cushion between the slider and the disk surface, the slider will come into contact with the disk surface and stiction will result. Stiction occurs as two very smooth surfaces stick to each other and effectively prevent the removal of one from the other. The stiction forces may be sufficient to prevent the rotation of the disk; but if the disk can be rotated, damage almost certainly will occur to the surface of the disk or slider due to the fact that the slider is in contact with and stuck to the disk surface as the disk moves relative to the slider. Stiction is prevented in the landing zone by having a sufficiently textured surface on the disk in this region.

The transducer/slider can be parked in a landing zone or on an unload device which removes the heads entirely from the disk surface. The actuator which moves the slider must be latched to prevent movement of the slider out of the parked position onto the data recording region of the magnetic disk.

Locking devices commonly are used to retain the actuator and accordingly retain the slider in a position that is not over the data portions of the disk, whereby contact of the slider to the disk surface will cause no damage; alternatively, these devices maintain the slider in a position where it is unloaded from the disk surface.

The latching or locking devices used typically have been mechanical latches, electromechanical latches, solenoid activated locking devices and magnetic latches. Mechanical latches typically are complex and require release mechanisms, while electromechanical latches require substantial electrical power to operate; in battery operated computers, the electrical power drain may severely shorten battery life. The solenoid lock systems also are relatively large consumers of electrical power and are relatively large in size and thus require a significant number of parts with associated cost and reliability considerations.

Magnetic latches have provided improvements over the prior approaches, by eliminating separate electronic circuits and substantial power consumption for the actuator latch, and utilizing magnetism to maintain the latch in a latched or unlatched position, thereby eliminating complex mechanical and power consumptive electrical components. One example of a magnetic latch is described in U.S. Pat. No. 5,363,261 issued to Eckberg et al. which teaches a magnetic bistable latch mechanism for latching the actuator of a disk drive into a parked position. The latch includes a magnetically detented latch lever including a latch plate which engages and latches a latch arm in a parked position by the attraction of the latch lever to a separate latch magnet located in a latch magnet housing attached to the base plate of the head stack assembly. The latch arm is held in either the latched or unlatched position by magnetic attraction. The lever is shifted from one position to the other by the rotation of the actuator against the latch lever by applying current to the voice coil. The system is designed such that the force required to latch the actuator is low, and the force required to unlatch the actuator is high. Other examples of magnetic latches are found in U.S. Pat. No. 5,381,290 issued to Cheng, and PCT International Publication Number WO 93/19460 to McFadden.

Although magnetic latch mechanisms have provided improvements relative to other approaches, the current designs suffer several limitations. For example, many magnetic latches with open magnetic circuits exert considerable forces (commonly called bias forces) when the actuator is near the latch, yet still over data tracks. This results in increased power consumption and can limit the maximum holding force generated by the latch. Still other magnetic latch mechanisms utilize a separate magnetic circuit which requires a secondary voice coil which is energized to latch and unlatch the actuator. This approach is expensive and requires additional electronic circuitry to operate, with increased reliability exposure. Still other latch mechanisms include several separate components, often mounted in different places of the disk drive. This results in the accumulation of tolerances and requires a larger landing zone for the transducer/slider. A larger landing zone comes at the expense of data tracks and reduces the overall storage capacity of the drive. Moreover, because the latch is often not whole until the drive is partially or completely assembled, testing of the latch function is more difficult, more costly and at a later stage in the file build process.

Another limitation encountered in current magnetic latch designs is that certain types of magnetic latches suffer from variations in magnetic properties of the separate permanent magnets housed in the actuator assembly to provide the necessary magnetic attraction for the latch and unlatch forces, due to processing conditions by the magnet manufacture or due to temperature effects. It is understood that variations such as these can compromise the latch design.

As increasing shock performance is demanded by the consumer, particularly in the laptop or notebook markets, the requirements on the latch mechanism to provide increased shock protection continue to increase. The challenge to the latch designer is to create a high performance, high reliability, low cost actuator latch mechanism within the significant design constraints imposed.

The aforementioned considerations present a significant challenge to the disk drive designer. There is a need for providing a reliable actuator latching mechanism which in particular meets the design requirements of hard disk drives.

SUMMARY OF THE INVENTION

To overcome the limitations in the prior art described above, and to overcome other limitations that will become apparent upon reading and understanding the present specification, the present invention discloses an improved actuator latching mechanism which is adapted for use in small disk drives. It is one aspect of the invention to provide an improved actuator latch that has higher shock performance at no additional cost. It is a further object of the invention to provide an actuator latch mechanism which is self compensating for changes in the voice coil motor magnetic field strength. Still other objects of the invention include providing a latch that has fewer components, thereby improving reliability at a significant cost reduction, and the ability to fully test the actuator latch at the subassembly level.

In order to accomplish the objects of the present invention, a latch mechanism is provided which utilizes the vcm magnetic field to generate the both the latch and unlatch force for the actuator, thereby eliminating separate magnetic components housed outside the vcm assembly. The latch mechanism comprises a latch lever pivotally mounted between the two plates of the vcm magnet in the disk drive assembly. The latch lever is essentially an extension of the portion of the actuator which holds the coil used to control the position of the actuator device and the suspension/slider assembly. The latch lever comprises a pair of arms extending from a pivot axis, wherein a pivot pin supports the latch lever for pivoting movement from a latched position to an unlatched position within the air gap between the plates in the vcm assembly. The latch lever further comprises a first magnetically soft member formed in or attached to the forward arm of the latch lever, and a second magnetically soft member formed in or attached to the trailing arm of the latch lever.

The latching force is provided by the attraction of the first magnetically soft member in the forward arm to the fringing fields of the vcm magnet. The latch force is determined by the size and shape of the member, its distance from the latch pivot and its relative location to the edge of the vcm magnet and plate surface.

The unlatching force is provided by the presence of the second magnetically soft member on the trailing arm of the lever in the vcm magnetic gap; the trailing arm of the lever, and accordingly the second magnetically soft member is pivotally positioned between the vcm magnets when the mechanism is in the latched state. The attraction of the second magnetic member in the gap field resists rotation of the latch lever. The unlatching force can be optimized by controlling the size and shape of the magnetic member, its orientation, its relative location in the vcm gap, and its distance from the latch pivot. The unlatch force can be increased to the limit of the servo system's capability to reliably unlatch by modifying these variables at no additional cost.

The latching mechanism according to the present invention extends from and moves with the actuator of the disk drive. When the latch mechanism is in the unlatched position, the actuator freely positions the suspension/slider assembly over the desired data tracks of the rotating disk. As the suspension/slider assembly is moved towards the landing position, the latch lever pivots such that the forward arm of the lever is moved in a direction away from the vcm magnets while the trailing arm is moved into the air gap between the vcm magnets. As the vcm latch lever rotates, the attraction of the second magnetic member quickly overcomes that of the first member, and draws the trailing arm of the lever into the gap until a small detent on the trailing arm contacts one of the magnets in the vcm assembly. Due to the attraction of the second member in the gap field, the latch lever resists rotation and accordingly, the actuator is effectively latched until the unlatch force is exerted. When the actuator arm and the actuator latch lever are in the locked position, the magnetic attraction holds the latch lever to prevent movement of the actuator arm and associated actuator. The actuator latch of the present invention requires very few parts and no electrical power to hold the actuator in the locked or unlocked positions.

To unlatch the actuator latch, the actuator is electrically powered to move the slider and lead beam from the parking zone to the recording surface of the disk. As the slider and load beam move to the recording area of the magnetic disk, the actuator arm engages with the wall of a recess in the latch lever thus urging the latch lever to its unlatched position. The force to unlatch the actuator latch and cause the movement of the latch lever from the latched to unlatched position is provided by briefly powering the coil of the voice coil motor which drives the actuator. The powering requirement of the voice coil motor is only a brief pulse, series of pulses or surges of electrical current within the coil sufficient to overcome the magnetic detenting force holding the latch lever in the latched or unlatched position.

The latch mechanism in accordance with the present invention provides a more balanced design that prior art mechanisms in that the latch plate may be replaced with a much smaller feature and located closer to the vcm magnet, as this member is only responsible for the lower latch force rather than both the latch and unlatch forces. Moreover, the second magnetically soft member which provides the unlatch force is located on the opposite side of the pivot, and counterbalances the first member. The net result is a latch with greater shock performance.

An additional feature of the latch mechanism in accordance with the present invention is that the unlatch force is now proportional with the actuator torque constant, meaning that the unlatch force is a function of the vcm magnetic field strength, as is the torque constant. Therefore, any variability in unlatch force due to magnetic field strength differences from one vcm to another is in part accommodated by a torque constant which responds in similar fashion. For example, consider a disk drive having vcm magnets at the upper end of the spectrum in terms of magnetic field strength, the assembly would have a higher than nominal unlatch force, but also a higher than nominal torque constant providing the extra force required to unlatch the actuator.

The latch mechanism in accordance with the present invention also provides a significant cost savings, as two components and two assembly operations are eliminated from the approach of Eckberg, et al. For example, by eliminating the latch magnet, the plastic magnet housing, the assembly of the magnet in the housing and the installation of the magnet in the base, a significant cost reduction is achieved in file build.

An additional feature of the present invention includes the ability to test the device at the component level, rather than at file build as in prior approaches. As the latch mechanism is self-contained in the vcm assembly, testing at the component level is now possible. Additionally, ability to clean the base is simplified as there is no longer any permanent magnet installed in the base outside the voice coil motor. Contamination exposure to the file is reduced by eliminating the step of installing the permanent magnet housing in the base, which has previously shown to generate particulate contamination.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
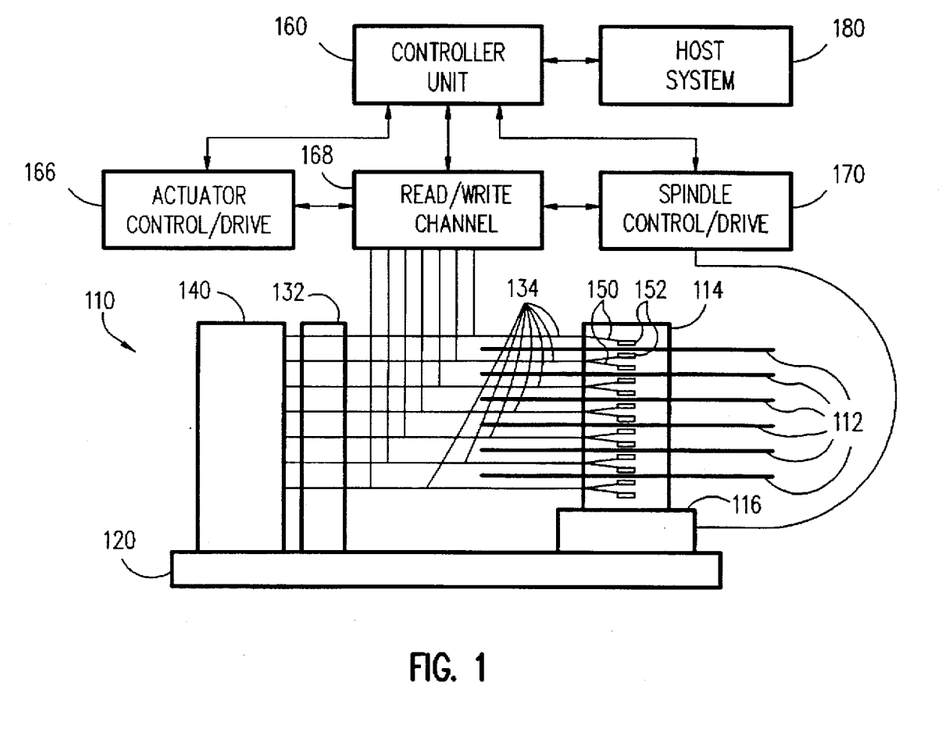
FIG. 1 illustrates a magnetic storage system according to the present invention.

FIG. 1 shows a disk drive system designated by the general reference number 110. The disk drive system 110 comprises a plurality of stacked magnetic recording disks 112 mounted to a spindle 114. The disks 112 may be conventional particulate or thin film recording disks. The spindle 114 is attached to a spindle motor 116 which rotates the spindle 114 and disks 112. A chassis 120 provides a housing for the disk drive system 110. The spindle motor 116 and an actuator shaft 130 are attached to the chassis 120. A hub assembly 132 rotates about the actuator shaft 130 and supports a plurality of actuator arms 134. The stack of actuator arms 134 is sometimes referred to as a "comb". A rotary voice coil motor 140 (vcm assembly) is attached to chassis 120 and to a rear portion of the actuator arms 134.

A plurality of suspension assemblies 150 are attached to the actuator arms 134. A plurality of transducer heads, or sliders 152 are attached respectively to the suspension assemblies 150. The sliders 152 are located proximate to the disks 112 SO that, during operation, they are in electromagnetic communication with the disks 112 for reading and writing. The vcm assembly 140 rotates actuator arms 134 about the actuator shaft 130 in order to move the suspension assemblies 150 to the desired radial position on disks 112. The shaft 130, hub 132, arms 134, and vcm assembly 140 may be referred to collectively as a rotary actuator assembly.

A controller unit 160 provides overall control to system 110. Controller unit 160 typically includes (not shown) a central processing unit (CPU), a memory unit and other digital circuitry, although it should be apparent that these aspects could also be enabled as hardware logic by one skilled in the computer arts. Controller unit 160 is connected to an actuator control/drive unit 166 which in turn is connected to the vcm 140. This configuration allows controller 160 to control rotation of the disks 112. A host system 180, typically a computer system, is connected to the controller unit 160. The host system 180 may send digital data to the controller 160 to be stored on disks 112, or it may request that digital data at a specified location be read from the disks 112 and sent to the system 180. The basic operation of DASD units is well known in the art and is described in more detail in *The Magnetic Recording Handbook*, C. Dennis Mee and Eric D. Daniel, McGraw-Hill Book Company, 1990.

Figure 2:
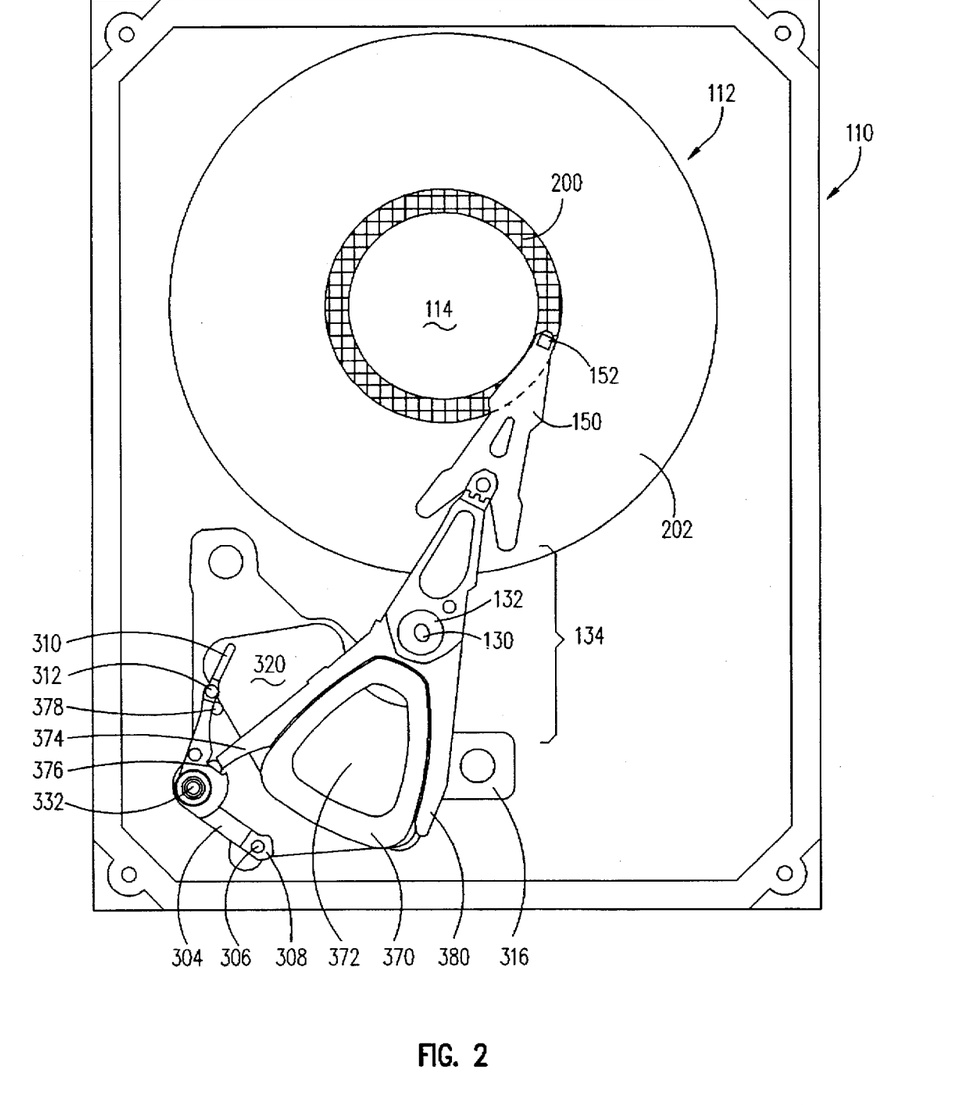
FIG. 2 illustrates an top view of a magnetic storage system according to the present invention.
Figure 3:
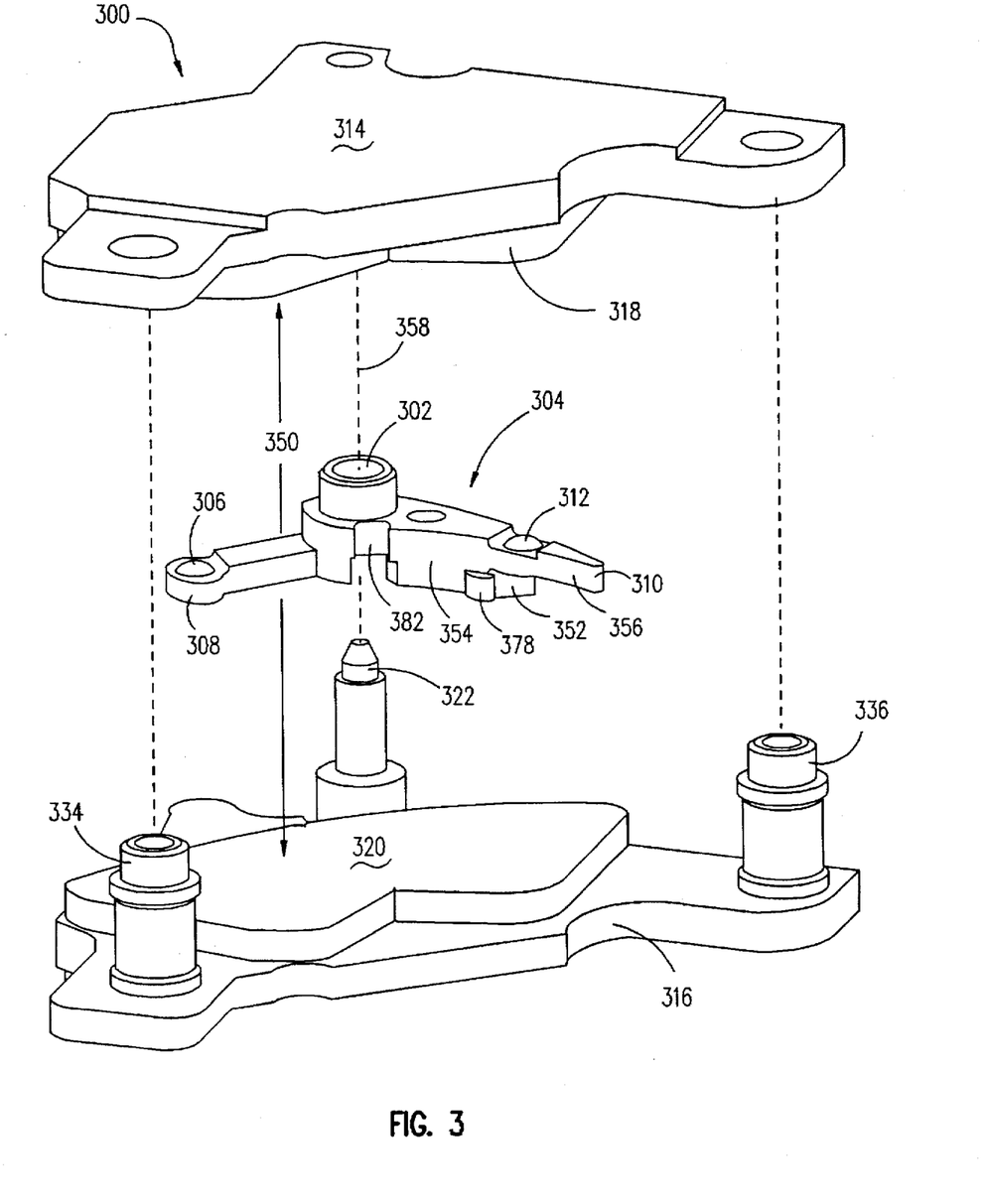
FIG. 3 illustrates an exploded view of the latch mechanism in accordance with the present invention.
Figure 4A:
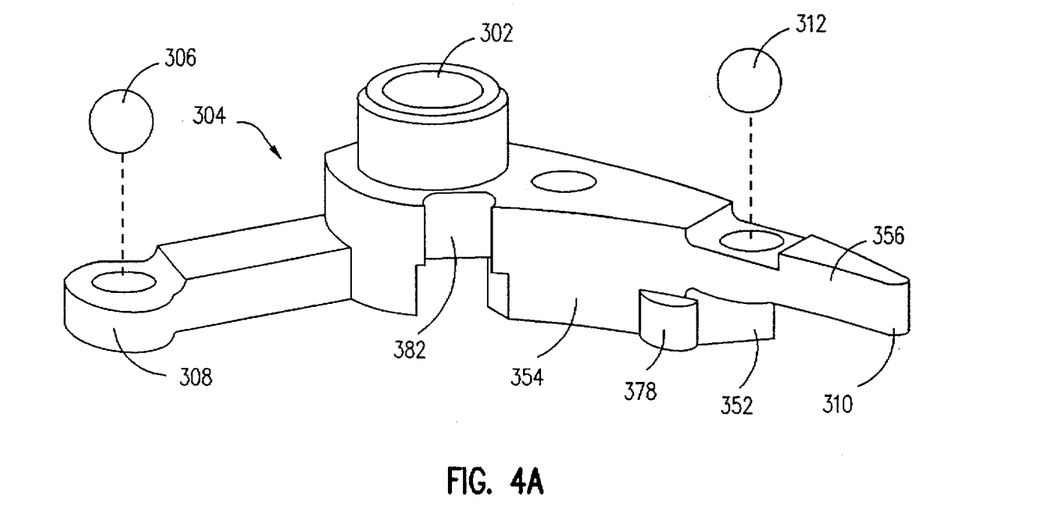
FIGS. 4a and 4b are isometric views of an improved latch lever for use in a latch mechanism in accordance with the present invention.
Figure 4B:
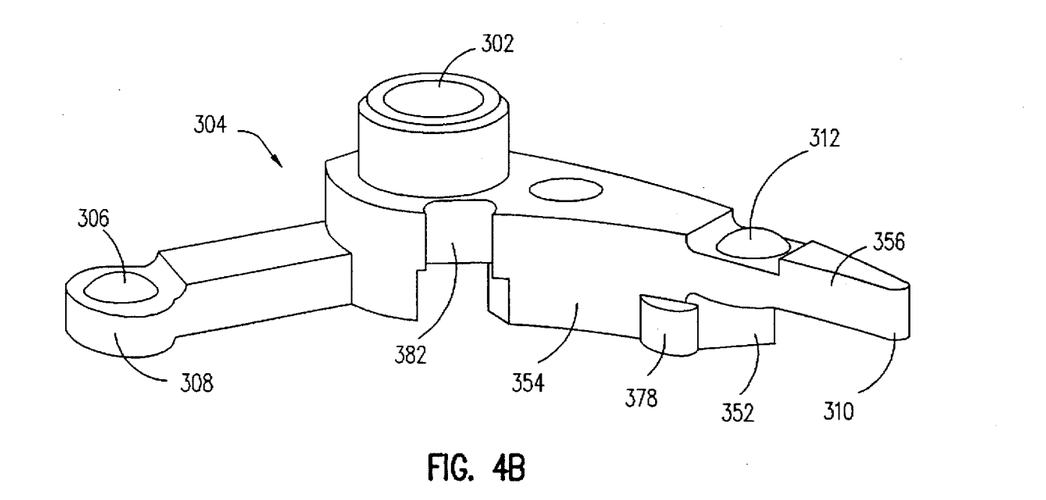
Figure 5:
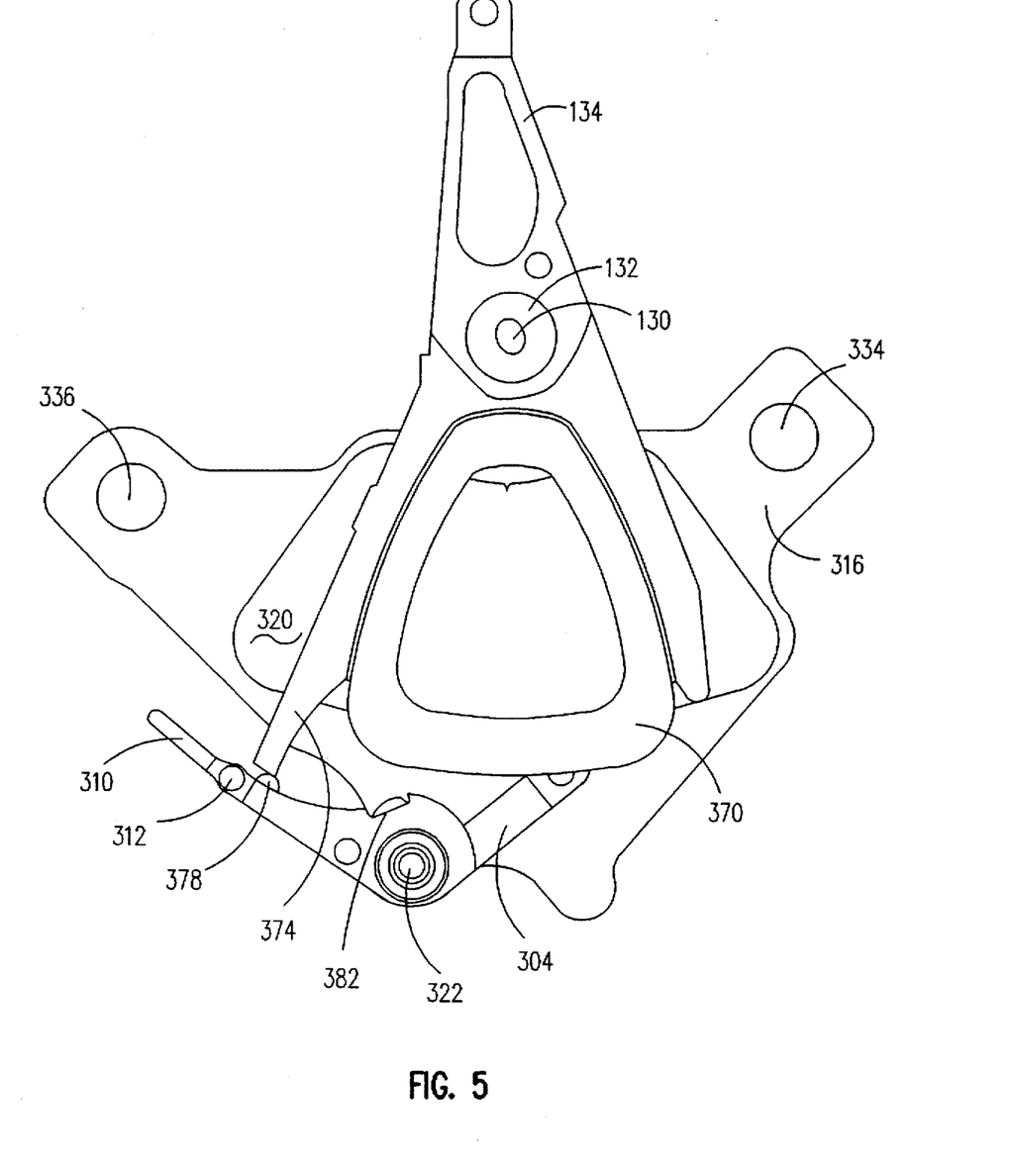
FIG. 5 is a top view of a disk drive magnetic actuator latch mechanism in accordance with the present invention, the actuator latch being shown in the unlatched position.
Figure 6:
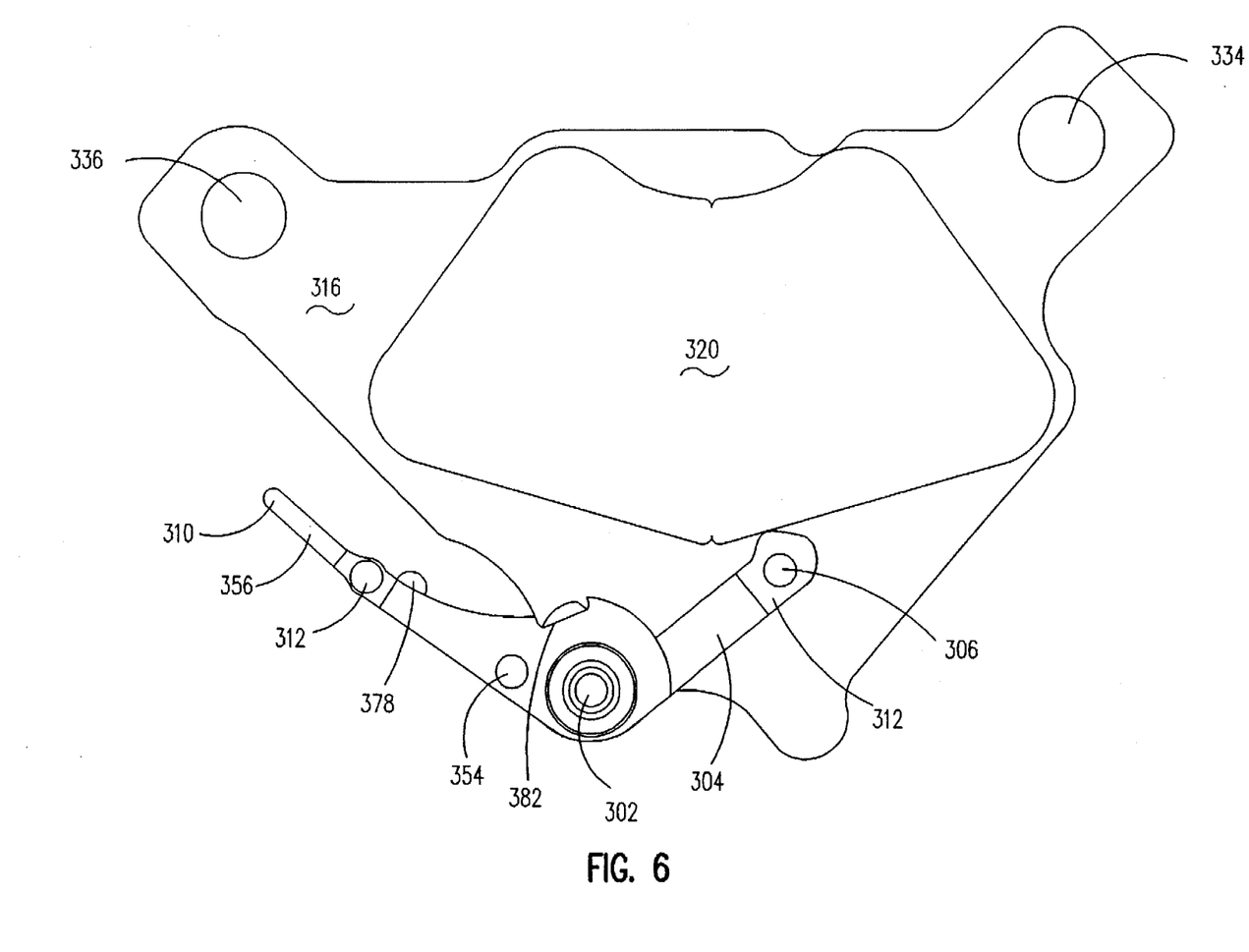
FIG. 6 is a cross-sectional view of the magnetic actuator latch shown in the unlatched position.
Figure 7:
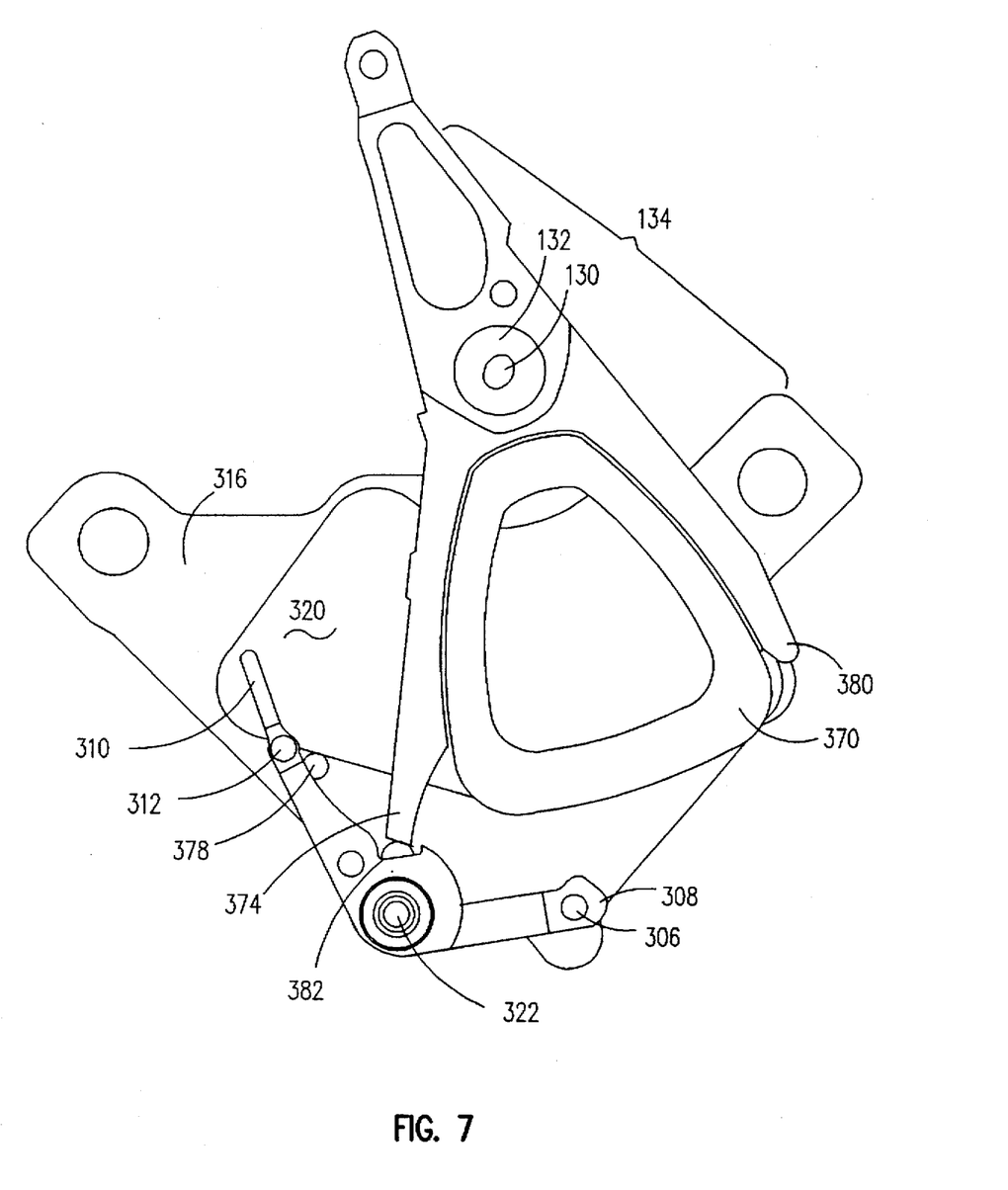
FIG. 7 is a top view of the disk drive magnetic actuator latch mechanism in accordance with the present invention, the actuator latch being shown in the latched position.
Figure 8:
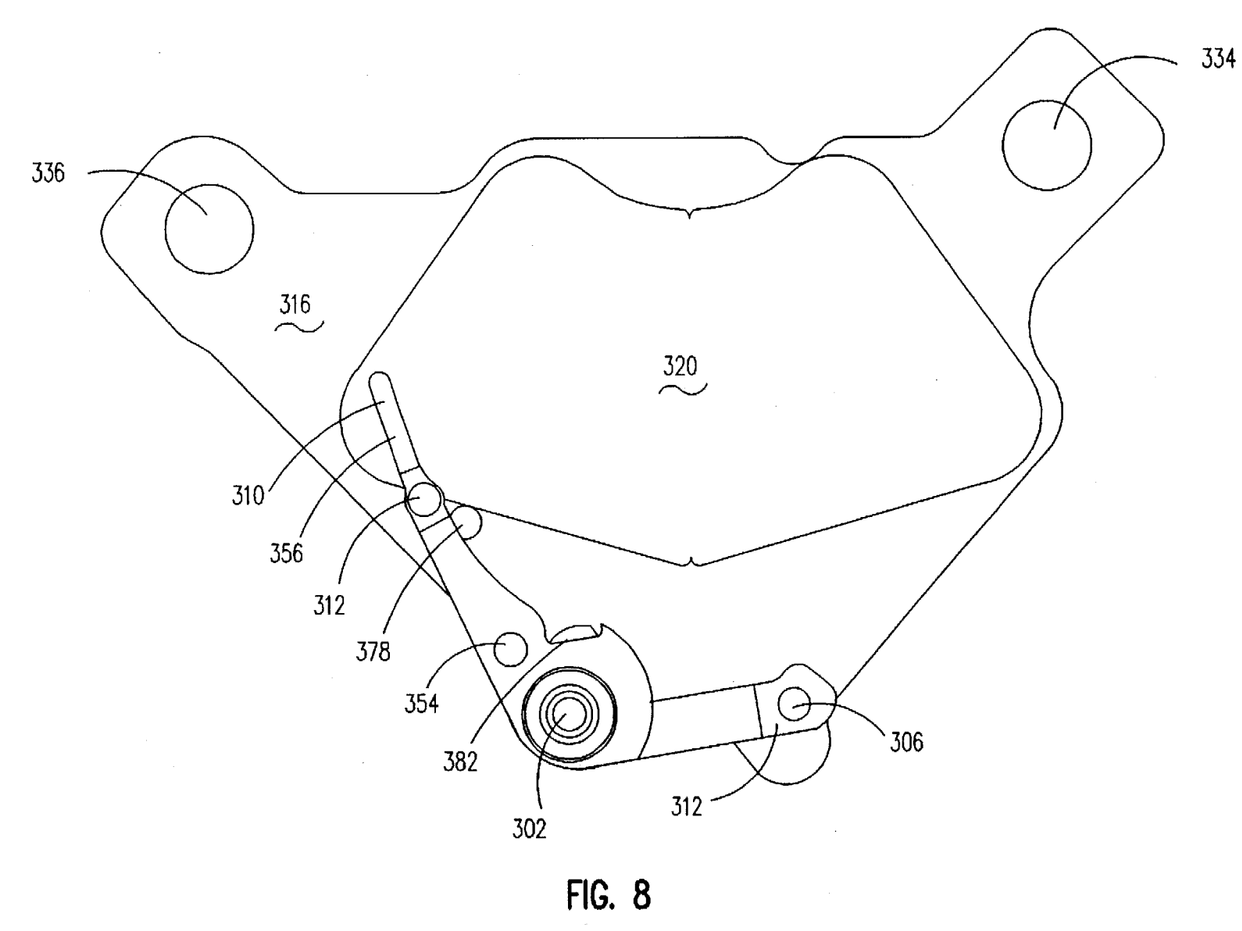
FIG. 8 is a cross-sectional view of the magnetic actuator latch shown in the latched position.

FIGS. 2–8 show the preferred embodiment of the latch mechanism of the present invention. Specifically, FIG. 3 shows an exploded view of the latch assembly of the present invention; FIGS. 4a and 4b show isometric views of the latch lever in accordance with the present invention; FIGS. 5 and 6 show the latch assembly of the present invention in the unlatched position; and FIGS. 7 and 8 show the latch assembly of the present invention in the latched position.

With reference to FIG. 2, which shows a top view of a magnetic storage system according to the present invention, it is seen that the slider 152 and suspension assemblies 150 may be moved to the desired radial position on disk 112. In FIG. 2, the actuator arm 134 is locked such that the slider 152 is parked over the inner diameter (ID) 200 (or landing zone) of disk 112. When the actuator arm 134 is not locked, the slider 152 may be positioned anywhere in the outer diameter 202 (or operating zone) of the disk. It is understood that the landing zone 200 does not contain data while the operating zone 202 does contain data.

Referring now to FIG. 3, which is an exploded view of the vcm and actuator latch 300 in accordance with the present invention, it can be seen that the latching mechanism 300 includes a latch lever 304 which is located between a top plate 314 and bottom plate 316, housed within the vcm assembly 140. On the lower surface of the top plate 314 is first vcm magnet 318, and on the upper surface of the bottom plate 316 is second vcm magnet 320. When fully assembled, an air gap 350 remains between the plates of the vcm assembly 140. Lever 304 is pivotally mounted on pivot pin 322 so that lever 304 can rotate about pivot axis 302 between the vcm magnets 318, 320 in the gap 350 therebetween. By using the vcm magnets 318, 320 to provide the both the latch and unlatch force, the latch magnet and magnet housing outside the vcm assembly 140 of prior art designs has been eliminated. The latch lever 304 of the present invention is comprised of a pair of arms extending from the pivot point 302; a forward arm 308 and a trailing arm 310. A first magnetically soft member 306 is attached to or formed in the forward arm 308, and a second magnetically soft member 312 is attached to or formed in the trailing arm 310 of the latch lever 304. In the exploded view, it can be seen that second magnetically soft member 312 on the trailing arm 310, is positioned for movement between the first vcm magnet 318 and second vcm magnet 320 in the latched position.

With reference now to FIGS. 4a and 4b, the latch mechanism 300 of the present invention includes lever 304, having a forward arm 308 and trailing arm 310 extending outward from a pivot point 302. With reference to FIG. 4a, the first magnetically soft member 306 is positioned near the end of forward arm 308 of the lever 304 and the second magnetically soft member 312 is positioned near the end of trailing arm 310 of the lever 304. As seen in FIG. 4b, for the purpose of assembly, first 306 and second 312 magnetically soft members can be insert molded in place, and can be of any desired geometry. In the illustrated embodiment, stainless steel balls were chosen due to their low cost and lack of orientation requirements. The magnetic members 306, 312 shown in FIGS. 4a and 4b, were 2 mm in diameter and the second magnetically soft member 312 was located 15 mm from the latch pivot point 302, coincident with the vcm magnet edge and centered in the vcm air gap 350 (as was shown in FIG. 3).

Still with reference to FIGS. 4a and 4b, it can be seen that the trailing arm 310 of the latch lever is thicker on the end proximate to pivot point 302, and thinner towards the distal end 356. The meeting point for the thicker and thinner portions of the trailing arm define a detent 352, upon which is formed a limit stop 378, which, when in the latched position, contacts the edge of the lower vcm magnet 320, thereby positioning the latch lever 304 in the latched position. Although FIGS. 4a and 4b show the limit stop 378 formed on the lower side of the lever 304 to contact the edge of the lower magnet 320, it is appreciated by those skilled in the art that limit stop 378 could be formed on the upper side of the lever 304 and catch on the upper vcm magnet 318.

The construction of lever 304 is typically of a plastic material with a relatively low mass. The strength requirements of the material are well within those of common plastics, and therefore, the structural strength of the latch lever 304 is not a significant consideration.

Operation of the latch mechanism 300 is best illustrated in FIGS. 5 through FIG. 8, which show the latch assembly 300 in the unlatched and latched states respectively. With reference first to FIGS. 5 and 6, to latch the actuator latch 300, the voice coil is powered to move the actuator/slider assembly from the data region 202 towards the parking zone 200 of the disks 112. As the slider 152 and suspension assembly 150 move to the parking zone 200 of the magnetic disk 112, the rear extension 374 of the actuator 134 engages with the wall of a recess 382 in the actuator latch lever 304, thus urging the latch lever 304 to its latched position. The force required to latch is created by the attraction of first magnetic member 306 to the fringe field of vcm magnet 320. The latch is designed such that the latching force is relatively low, thereby ensuring that the system can reliably lock the actuator 134 in the parking zone 200. This is especially important during an unintentional power-off situation, where the current available to power the vcm is limited, and the actuator must sufficiently engage the latch lever and lock in the parking zone before the disks stop rotating and damage is incurred.

With reference now to FIGS. 7 and 8, to unlatch the actuator latch 300, the actuator arm 134 is powered to move the slider and load beam from the parking zone 200 to the recording surface 202 of the disk 112. As the slider 152 and suspension assembly 150 move to the recording area 202 of the magnetic disk 112, the rear extension 374 of the actuator arm 134 engages with the wall of a recess 382 in the actuator latch lever 304 thus urging the latch lever 304 to its unlatched position. The force to unlatch the actuator latch 300 and cause the movement of the latch lever 304 from the latched to unlatched position is provided by briefly powering the coil of the voice coil motor 140 which drives the actuator arm 134. The powering requirement of the voice coil motor 140 is only a brief pulse, series of pulses or surges of electrical current within the coil sufficient to overcome the magnetic detenting force holding the latch lever 304 in the latched or unlatched position. If necessary, the actuator arm 134 may be powered in a latching direction and then the current reversed to obtain maximum momentum, to impact the latch lever 304, effectively unlatching the latch lever 304. With only a very brief period of increased electrical current flow, electrical power consumption necessary to latch or unlatch the actuator arm 134 is minimized.

When the actuator arm 134 and the actuator latch lever 304 are in the locked position, the magnetic attraction holds the latch lever 304 to prevent movement of the trailing latch arm 310 and associated actuator arm 134. The actuator lock mechanism 300 requires very few parts and no electrical power to hold the actuator arm 134 in the locked position.

Referring again to FIGS. 7 and 8, which show the latch in the latched state. It can be seen that second magnetically soft member 312 on the trailing arm 310, is positioned for movement between the first vcm magnet 31 8 and second vcm magnet 320 in the latched position. The unlatching force is provided by the presence of the second magnetic member 312 in the vcm magnetic gap 350, as the attraction of the second magnetically soft member 312 resists rotation of the latch lever 304. The force acting on member 31 2 is created by the non-uniform magnetic field of the vcm. It is well known to those skilled in the art that a ferrous body positioned in a non-uniform magnetic field has a force exerted on it such that it is attracted to the region of the largest flux gradient. Furthermore, the total force on the ferrous body is proportional to the gradient of the applied field. For a typical disk drive vcm design it is intuitive that the region of highest flux gradient is near the edge of the magnets. The preferred location for member 312 is that which is most efficient (having the highest force per unit volume of material), and reasonably insensitive to small changes in location. Having an operating point where small changes in the change of location of member 312 produce relatively large variations in force is undesirable due to unavoidable manufacturing tolerances. It is readily obvious that the optimum location for member 312 is a function of the total magnetic circuit, and is thus unique for each vcm design. The actual location of member 31 2 is determined by finite element magnetic analysis and empirical methods.

Figure 9:
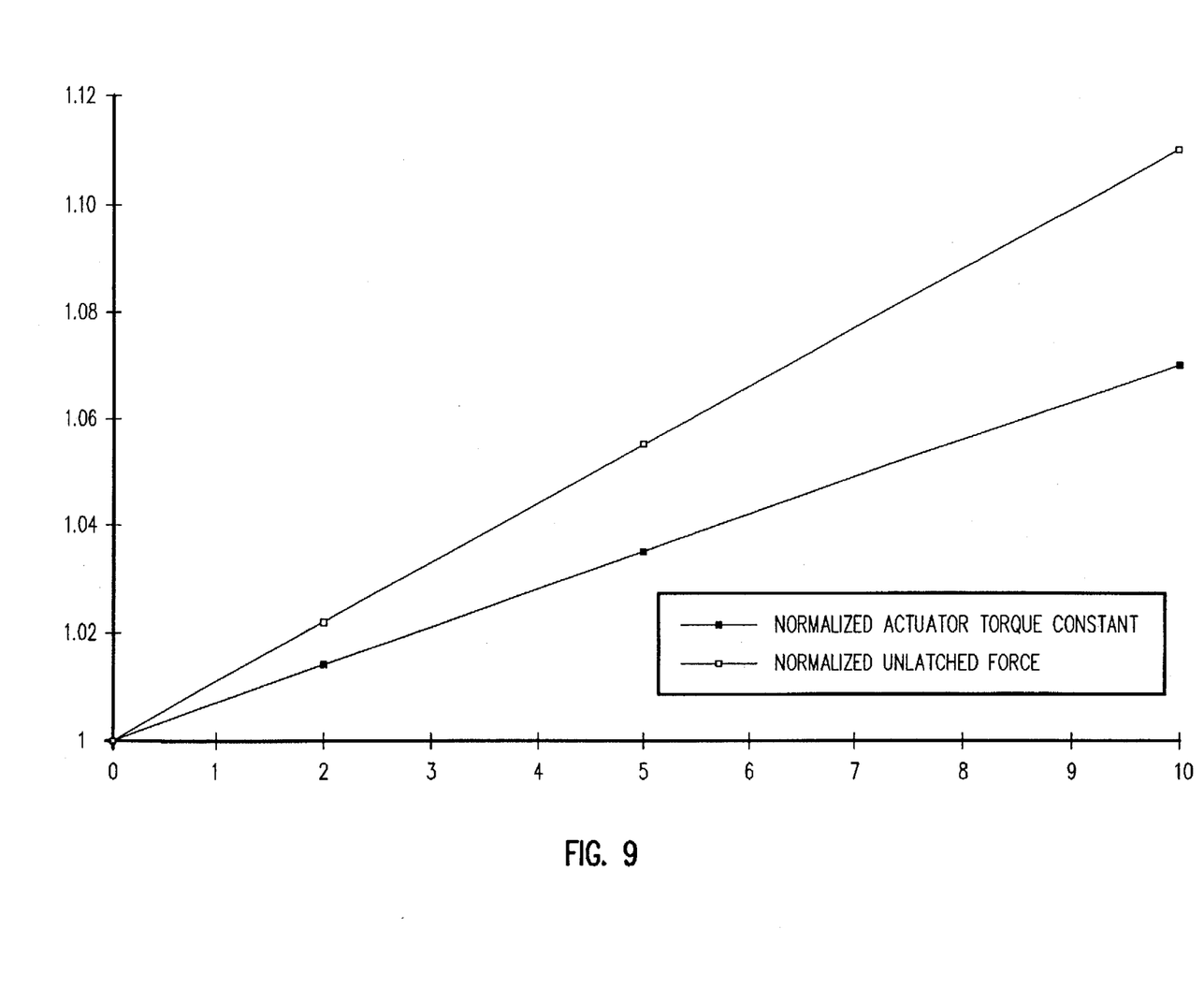
FIG. 9 is a graph showing the vcm magnetic field strength and a comparison between normalized actuator torque and normalized unlatch force.

An additional feature provided by the latch mechanism of the present invention is illustrated by the graph shown in FIG. 9, which is a comparison of the actuator unlatch force to the actuator torque constant. As seen in FIG. 9, the preferred embodiment of the present invention provides a latching mechanism wherein the unlatch force is now proportional with the actuator torque constant, meaning that the unlatch force is a function of the vcm magnetic field strength, as is the torque constant. The normalized data shown in the graph of FIG. 9 was obtained using a 2 mm stainless steel ball located 15 mm from the distal end of the trailing arm of the latch lever. The lever was self contained in the vcm assembly for 3.5" size disk file system. It can be appreciated by the illustrated data that any variability in unlatch force due to the magnetic field strength differences from one vom to another is in part accommodated by a torque constant which responds in a similar fashion.

Although the present invention as set forth herein was described in the best mode currently known to the inventors, it should be understood that various changes and modifications to the presently preferred embodiments that are described herein will be apparent to those skilled in the art. Such changes and modifications can be made without departing from the spirit and scope of the present invention, and without diminishing its attendant advantages. It is, therefore, intended that such changes and modifications can be covered in the appended claims.

I claim:

1. A magnetic actuator latch for a disk drive comprising:

an actuator having a latch arm pivotable by the actuator, the latch arm disposed in a gap between an upper an upper magnet and a lower magnet of a vcm assembly;

a latch lever comprising a pair of arms extending from a pivot axis; said pair of arms comprising a forward end having a first magnetically soft member formed thereon, and a tail end having a second magnetically soft member formed thereon; the arms pivotally moveable between two positions defined by two limit stop members and the lever magnetically attracted to each of the two positions;

means for supplying current to the vcm assembly to create a magnetic circuit so that the latch arm may be pivotally moved within the gap of the vcm assembly between a locked position where the latch arm is engaged with a recess wall on the latch lever and an unlocked position where the latch arm is not engaged with the recess wall on the latch lever, whereby the magnetically attracted lever is held in the first position by the attraction of the first magnetically soft member to the fringing fields of the lower magnet of the vcm assembly and the magnetically attracted lever is held in the second position by the attraction of the second magnetically soft member by the non-uniform flux gradient of the vcm magnetic circuit.

2. The magnetic actuator latch of claim 1, further comprising a pivot pin about which the latch lever pivotally rotates.

3. The magnetic actuator latch of claim 2, wherein one of said stop limit members is a detent on the latch lever tail.

4. The magnetic actuator latch of claim 3, wherein said first and second magnetically soft members are insert molded to said latch lever.

5. The magnetic actuator latch of claim 3, wherein said first and second magnetically soft members are attached to said latch lever.

6. A direct access storage device for storing data on a magnetic disk comprising:

a rotatable disk having a magnetic recording media on at least one surface thereof and having an access for rotation;

an actuator having an actuator drive motor disposed on a base member and displaced from said disk, the actuator comprising a load beam having a distal end projecting from the actuator and toward the surface of the disk, the actuator pivotable relative to the base member about an axis parallel to the axis of rotation to translate said load beam distal end across the surface of the disk between an inner limit of travel and an outer limit of travel, the actuator further comprising a latch arm pivotable by the actuator and disposed in a gap between an upper magnet and a lower magnet of a vcm assembly;

an latch lever for holding the actuator and load beam in a restricted position relative to the access of rotation, said latch lever comprising a pair of arms extending from a pivot axis; said pair of arms comprising a forward end having a first magnetically soft member formed therein, and a tail end having a second magnetically soft member formed thereon; the arms pivotally moveable between two positions defined by two limit stop members and the lever magnetically attracted to each of the two positions; and means for supplying current to the vcm assembly to create a magnetic circuit so that the latch arm may be pivotally moved within the gap of the vcm assembly from a locked position where the latch arm is engaged with a recess wall on the latch lever and an unlocked position where the latch arm is not engaged with the recess wall on the latch lever, whereby the magnetically attracted lever is held in the first position by the attraction of the first magnetically soft member to the fringing fields of the lower magnet of the vcm assembly, and the magnetically attracted lever is held in the second position by the attraction of the second magnetically soft member by the non-uniform flux gradient of the VCM magnetic circuit.

7. The direct access storage device of claim 6, further comprising a pivot pin about which the latch lever pivotally rotates.

8. The direct access storage device of claim 7, wherein one of said stop limit members is a dent on the latch lever tail.

9. The direct access storage device of claim 8, wherein said first and second magnetically soft members are insert molded to said latch lever.

10. The direct access storage device of claim 8, wherein said first and second magnetically soft members are attached to said latch lever.

\* \* \* \* \*